(12) United States Patent
Naylor et al.

(10) Patent No.: US 7,854,271 B2
(45) Date of Patent: Dec. 21, 2010

(54) MARKER ASSEMBLY HAVING RIGID LINK AND CAM ASSEMBLY

(75) Inventors: Matthew S. Naylor, Saskatoon (CA); Ryan R. Georgison, Saskatoon (CA); Dennis G. Thompson, Saskatoon (CA)

(73) Assignee: CNH Canada, Ltd. (CA)

( * ) Notice: Subject to any disclaimer, the term of this patent is extended or adjusted under 35 U.S.C. 154(b) by 21 days.

(21) Appl. No.: 12/494,720

(22) Filed: Jun. 30, 2009

(65) Prior Publication Data

US 2010/0200254 A1 Aug. 12, 2010

Related U.S. Application Data

(60) Provisional application No. 61/151,402, filed on Feb. 10, 2009.

(51) Int. Cl.
*A01B 17/00* (2006.01)

(52) U.S. Cl. .................. 172/126; 172/452; 172/311

(58) Field of Classification Search ......... 172/126–132, 172/310, 311, 452–460, 463, 467, 474, 478, 172/479, 668; 111/25, 33, 53, 57
See application file for complete search history.

(56) References Cited

U.S. PATENT DOCUMENTS

| | | | |
|---|---|---|---|
| 976,771 A | 11/1910 | Artz | |
| 2,031,463 A | 2/1936 | Choate et al. | |
| 2,498,888 A | 2/1950 | Hyland et al. | |
| 3,094,172 A | 6/1963 | Ose et al. | |
| 3,250,333 A | 5/1966 | Day | |
| 3,520,373 A | 7/1970 | Stinemetz | |
| 3,666,019 A | 5/1972 | Yeske | |
| 3,833,066 A | 9/1974 | Hitt | |
| 3,972,476 A | 8/1976 | Hall | |
| 4,030,551 A | 6/1977 | Boetto et al. | |
| 4,058,170 A | 11/1977 | Ankenman et al. | |
| 4,074,766 A | 2/1978 | Orthman | |
| 4,244,428 A | 1/1981 | Sloan | |
| 4,360,066 A | 11/1982 | Mann | |
| 4,368,806 A | 1/1983 | Raineri | |
| 4,425,857 A | 1/1984 | Lienemann et al. | |
| 4,449,590 A | 5/1984 | Williamson | |
| 4,449,725 A | 5/1984 | Robison et al. | |

(Continued)

FOREIGN PATENT DOCUMENTS

EP 114983 8/1984

*Primary Examiner*—Robert E Pezzuto
(74) *Attorney, Agent, or Firm*—Rebecca Henkel

(57) ABSTRACT

A marker assembly mountable to an agricultural implement includes a set of interconnected frame sections that can be pivoted with respect to one another to retract the marker assembly for transport and/or storage. The marker assembly has a support wheel that supports the marker assembly above the ground as the marker assembly is being deployed and when in an extended working position. The point at which the support wheel engages the ground is controlled by a rigid link and cam assembly. The rigid link has a first end connected to a first frame section and a second end connected to a lever arm that is connected to a link of a second frame section. The rigid link is operative to pull down on the lever arm when the marker assembly is being deployed so as to force the second frame section away from the first frame section. The amount the second frame section pulls away from the first frame section is determined by the cam assembly.

18 Claims, 10 Drawing Sheets

U.S. PATENT DOCUMENTS

| | | |
|---|---|---|
| 4,467,872 A | 8/1984 | Hodapp |
| 4,526,236 A | 7/1985 | Jacobsen |
| 4,530,405 A | 7/1985 | White |
| 4,570,722 A | 2/1986 | Osborn |
| 4,632,417 A | 12/1986 | Hodapp |
| 4,634,051 A | 1/1987 | Dudley |
| 4,660,651 A | 4/1987 | Pfenninger et al. |
| 4,674,578 A | 6/1987 | Bexten et al. |
| 4,790,389 A | 12/1988 | Adee et al. |
| 4,825,958 A | 5/1989 | Kelderman |
| 4,878,545 A | 11/1989 | Dyken |
| 4,923,017 A | 5/1990 | Meek et al. |
| 4,944,355 A | 7/1990 | Karchewski |
| 4,986,367 A | 1/1991 | Kinzenbaw |
| 5,248,091 A | 9/1993 | Thyberg |
| 5,253,717 A | 10/1993 | Roush et al. |
| 5,291,954 A | 3/1994 | Kirwan |
| 5,379,847 A | 1/1995 | Snyder |
| 5,425,427 A | 6/1995 | Haugen |
| 5,485,796 A | 1/1996 | Bassett |
| 5,573,070 A | 11/1996 | Meek et al. |
| 5,660,237 A | 8/1997 | Boyko et al. |
| 5,921,325 A | 7/1999 | Meek et al. |
| 5,953,894 A | 9/1999 | Aron et al. |
| 5,957,216 A | 9/1999 | Redekop |
| 5,992,534 A | 11/1999 | Callies et al. |
| 6,027,039 A | 2/2000 | Mercil |
| 6,076,613 A * | 6/2000 | Frasier ............... 172/311 |
| 6,079,114 A | 6/2000 | Toews |
| 6,082,467 A | 7/2000 | Friesen |
| 6,119,963 A | 9/2000 | Bastin et al. |
| 6,125,944 A | 10/2000 | Redekop |
| 6,202,756 B1 * | 3/2001 | Hundeby et al. ........ 172/311 |
| 6,257,343 B1 | 7/2001 | Maenle et al. |
| 6,334,491 B1 | 1/2002 | Nevin |
| 6,374,923 B1 | 4/2002 | Friggstad |
| 6,382,327 B1 | 5/2002 | Mosdal |
| 6,397,952 B1 | 6/2002 | Hundeby |
| 6,611,993 B2 | 9/2003 | Ray |
| 6,708,775 B2 | 3/2004 | Beaujot |
| 6,889,915 B2 | 5/2005 | Guesdon |
| 7,743,843 B1 * | 6/2010 | Gadzella et al. .......... 172/126 |

\* cited by examiner

US 7,854,271 B2

MARKER ASSEMBLY HAVING RIGID LINK AND CAM ASSEMBLY

CROSS-REFERENCE TO RELATED APPLICATION

The present application claims the benefit of U.S. Ser. No. 61/151,402, filed Feb. 10, 2009.

BACKGROUND OF THE INVENTION

The present invention relates generally to agricultural implements and, more particularly, to a marker assembly for use with an agricultural implement and having a float feature that allows limited vertical displacement of the marker assembly to accommodate variations in ground contours.

Agricultural seeders, which are commonly used to deposit seed, fertilizer, and granular chemicals onto a farm field, generally consist of a towable frame that supports one or more rows of seed units. Seed or other granular product is typically metered to the seed units which in turn deposit the product onto the farm field. The seeder will often include furrowing opening devices, such as coulters, knives, shanks, and the like that cut a furrow into the farm field immediately ahead of the seed units so that the granular product is deposited into a furrow rather than simply atop the farm field. A trailing packer will then pack the furrow to improve germination and/or fertilization.

Agricultural seeders are also commonly outfitted with a pair of marker assemblies. Each marker assembly will generally include a marker frame which carries a marking disc. A seeder will typically have a marker frame extending laterally on opposite sides of the seeder, and the marker frames can be independently raised and lowered by a respective lift assembly, such as a hydraulic cylinder. The marking disc is designed to cut a furrow into the farm field which serves as a marker as to the position of the seeder as the field was passed. Thus, during a subsequent pass of the farm field, the operator can position the seeder so that the next pass is properly aligned with the previous seeding pass to prevent overseeding of a previously seeded area or to prevent undesirable gaps in the seeded rows. Improper uniformity in spacing of the rows as well as distribution of the seed can negatively impact crop yields.

Increasingly, there is a desire for a foldable or collapsible marker assembly that can be retracted from an extended, working position to a folded position for transport and storage. However, for such a marker assembly, precise control of the deployment of the marker assembly from a retracted, stow position to an extended, working position is needed.

SUMMARY OF THE INVENTION

The present invention is directed to a marker assembly mountable to an agricultural implement and comprised of a set of interconnected frame sections that can be pivoted with respect to one another to retract the marker assembly for transport and/or storage. The marker assembly has a support wheel that supports the marker assembly above the ground as the marker assembly is being deployed and when in an extended working position. The point at which the support wheel engages the ground is controlled by a rigid link and cam assembly. The rigid link has a first end connected to a first frame section and a second end connected to a lever arm that is connected to a link of a second frame section. The rigid link is operative to pull down on the lever arm when the marker assembly is being deployed so as to force the second frame section away from the first frame section. The amount the second frame section pulls away from the first frame section is determined by the cam assembly.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION OF THE INVENTION

Figure 1:
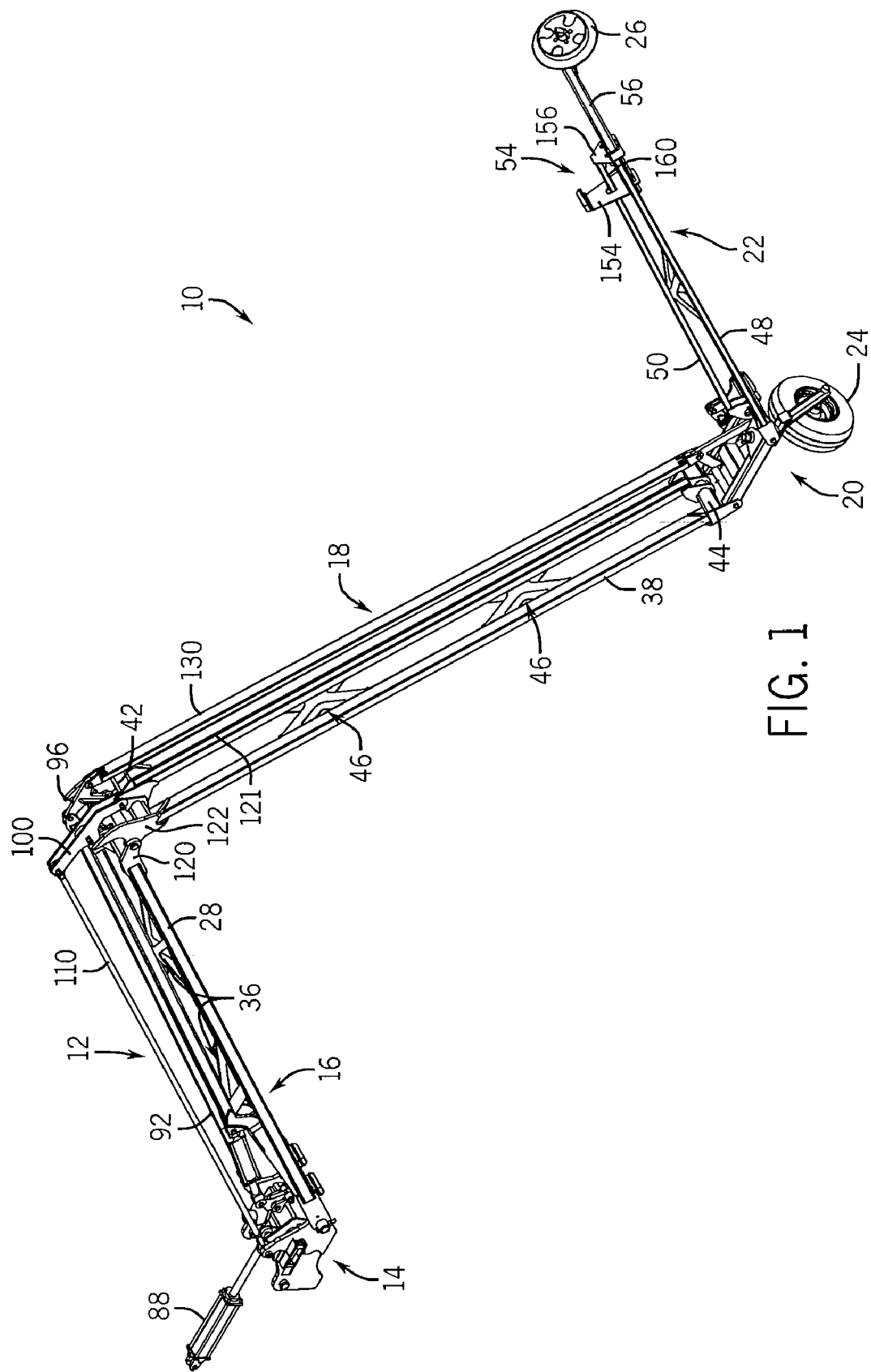
FIG. 1 is an isometric view of a marker assembly according to one embodiment of the invention.

The present invention is directed to a marker assembly 10, shown in FIG. 1 in a partially deployed position, for use with an agricultural implement, such as a seeder (not shown). The marker assembly is generally comprised of a multi-linked frame 12 that includes a mounting assembly 14, an inner frame section 16, a central frame section 18, a caster wheel assembly 20, and an outer frame section 22. Each of these will be described in greater detail below. As will become apparent from the following description, the marker assembly 10 is designed to be folded into a transport or stow position and may be extended to a working position. FIG. 1 shows the marker assembly in a pre-deployment position in which the linkage sections 16, 18, and 22 are partially extended. The marker assembly 10 is generally supported by its connection to the frame (not shown) of the agricultural implement and a wheel 24, which is free to caster as will be described. The outer frame section 22 carries a marking disc 26 designed to cut a marking furrow into the soil as the agricultural implement is being towed with the marking disc 26 in a ground engaging position. As will be described more fully below, the distance of the marking disc 26 from the agricultural implement may be varied to provide a user some flexibility in establishing the spacing of the marking furrow from the agricultural implement.

The inner linkage section 16 is generally defined by a pair of spaced but parallel frame tubes 28, 30 connected at one end by a cross tube 32 connected at an opposite end by a cross tube 34. To provide additional stability for the inner frame section, tubes 28, 30 are connected to one another by a series of intersecting plates, generally referenced 36. It is understood that other stability arrangements other than those shown in the figures may be used.

The central frame section 18 also includes a pair of elongate tubes 38, 40 interconnected by a pair of cross tubes 42, 44. A series of intersecting members 46 also extend between the tubes 38, 40 to provide additional structural integrity to the central frame section 18.

The outer frame section 22 includes a pair of elongate tubes 48, 50 that are angled toward one another and are interconnected at one end by a cross tube 52 and another end by a retainer 54. As will be described more fully below, the retainer 54 interconnects tubes 48, 50 to a telescoping tube 56, to which marking disk 26 is connected.

The aforementioned linkage sections will be described in greater detail below with reference to FIGS. 2 through 10.

Figure 2:
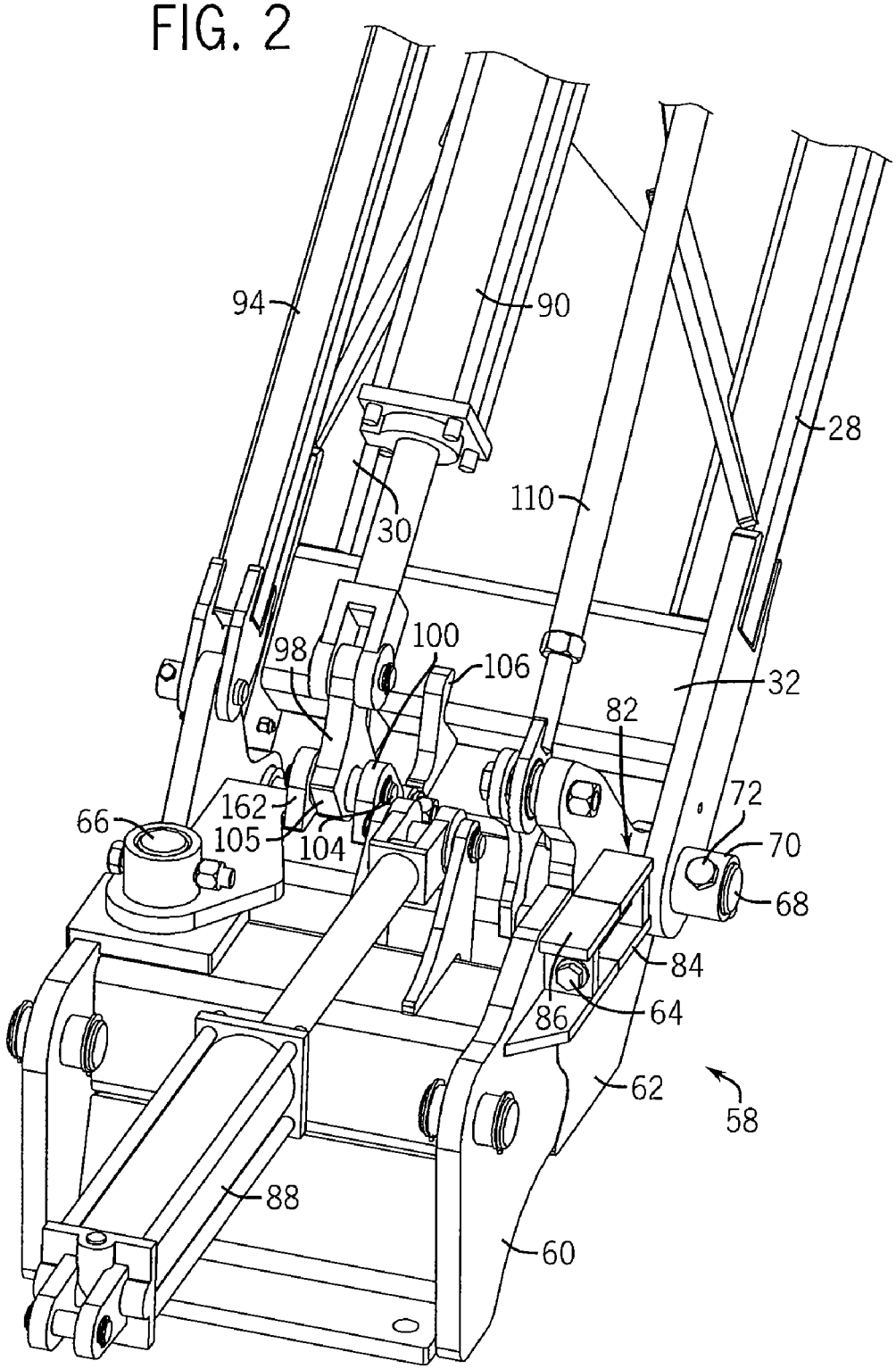
FIG. 2 is a side isometric view of a mounting end of the marker assembly shown in FIG. 1.
Figure 3:
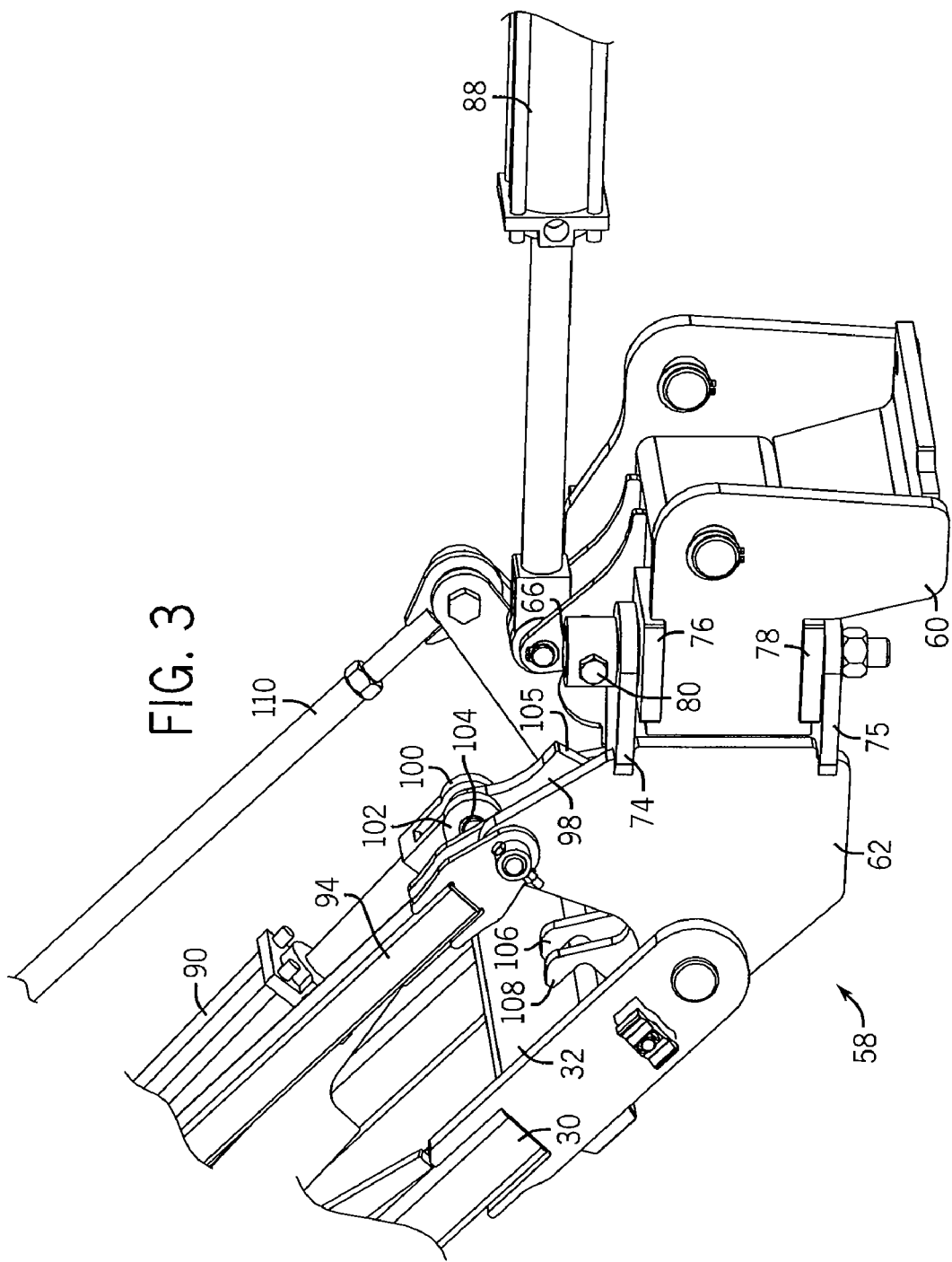
FIG. 3 is a rear top isometric view of the mounting end of the marker assembly shown in FIGS. 1 and 2.

FIGS. 2 and 3 are partial front top perspective and partial rear top isometric views of the marker assembly 10 and, more particularly, the mounting assembly 14 and the connection of the inner frame section 16 to the mounting assembly 14. The mounting assembly 14 includes a knuckle 58 comprised of an inner knuckle member 60 and an outer knuckle member 62. The inner knuckle member 60 is mountable to the frame of the agricultural implement in a conventional manner and the outer knuckle member 62 is connected to the inner knuckle member 60 by a tension bolt 64 and a vertically oriented pin 66. The tubes 28, 30 are secured to the outer knuckle member 62 by a shaft 68 that is passed through openings (not numbered) in the tubes 28, 30 and through the cross tube 32. The shaft 68 fits within a boss 70 at the side of the tube 28 and a cross bolt 72 is passed through openings in the shaft 68 and the boss 70 to secure the shaft 68 to the boss 70 and thus to the tube 28.

Figure 3A:
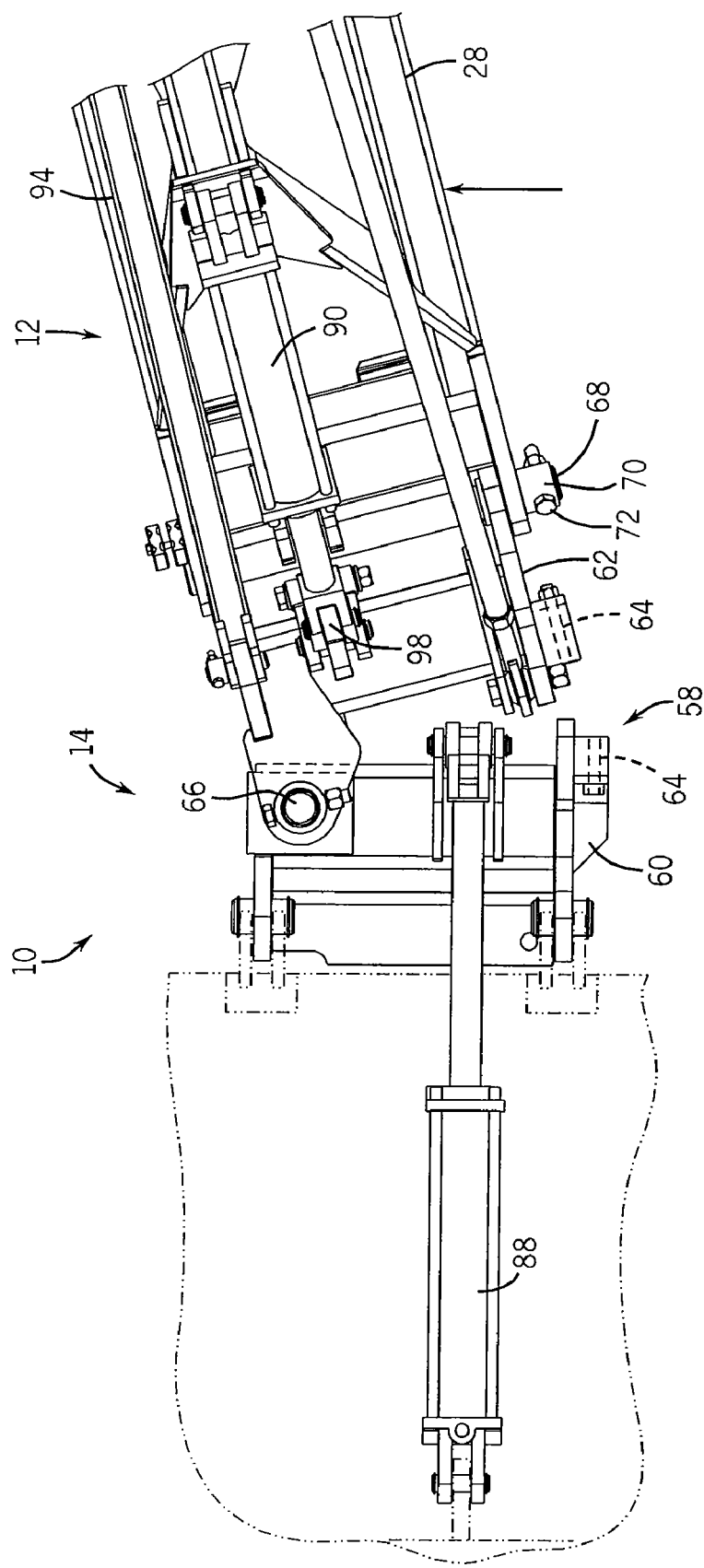
FIG. 3A is a top plan view of the marker assembly shown in a breakaway position according to one aspect of the invention.

As shown particularly in FIG. 3, the outer knuckle member 62 has a top ear 74 and a bottom ear 75 that fit over lateral plates 76, 78 of the inner knuckle member 60. The lateral plates 76, 78 and the ears have openings (not numbered) that when aligned allow for vertical pivot pin 66 to be dropped into a passage (not shown) formed in the inner knuckle member 60. The vertical pivot 66 is secured to the inner knuckle member 60 by bolt 80. The connection of the inner and outer knuckle members 60, 62 allows the outer knuckle member 62 to pivot relative to inner knuckle member 60 in a generally rearward direction and about a vertical axis defined by the vertical pin 66, as shown in FIG. 3A.

That is, the knuckle 58 is designed so that the outer knuckle member 62, and the inner frame section 16 connected thereto, can rotate in a rearward direction (opposite the direction of travel of the implement). Such rotation is permitted when the tension bolt 64 breaks. The tension bolt 64 is carried by a bolt housing 82 that is defined by an outer housing portion 84 and an inner housing portion 86. The outer housing portion 84 extends from a side of the outer knuckle member 62 and the inner housing portion 86 extends from a side of the inner knuckle member 60. Other than the pivot pin connection described above, the only other connection of the inner and outer knuckle members is by the tension bolt 64 that connects the inner and outer housing portions. When the tension bolt breaks 64, those housing portions become separated, which allows the inner linkage 16, as well as, the other linkages, to pivot rearwardly. The tension bolt 64 is designed to fail, e.g., break, when the deployed marker assembly 10 encounters a field obstruction with sufficient force to overcome the integrity, e.g., tensile force, of the tension bolt 64. When such an obstruction is encountered, the implement will continue to move in a forward direction and will try to pull the marker assembly "through" the obstruction. This can lead to damage in the implement and the marker assembly. As such, the present invention allows the marker assembly 10 to pivot rearward so as to clear the obstruction, if the obstruction is massive enough to cause failure of the tension bolt 64.

As noted above, the marker assembly 10 is designed to be folded into a transport or stow position and may then be extended from such a position to a working position. This aforementioned movement is controlled by a pair of actuators 88, 90, e.g., cylinders. Actuator 88 is designed to move the marker assembly 10 from an upright retracted position to a horizontal stow position for transport and storage. Actuator 90 on the other hand is designed to extend and retract the marker assembly 10. The actuator 90 is connected to the upper link 92, which in turn is connected to cross tube 34 of the inner frame section.

Figure 4:
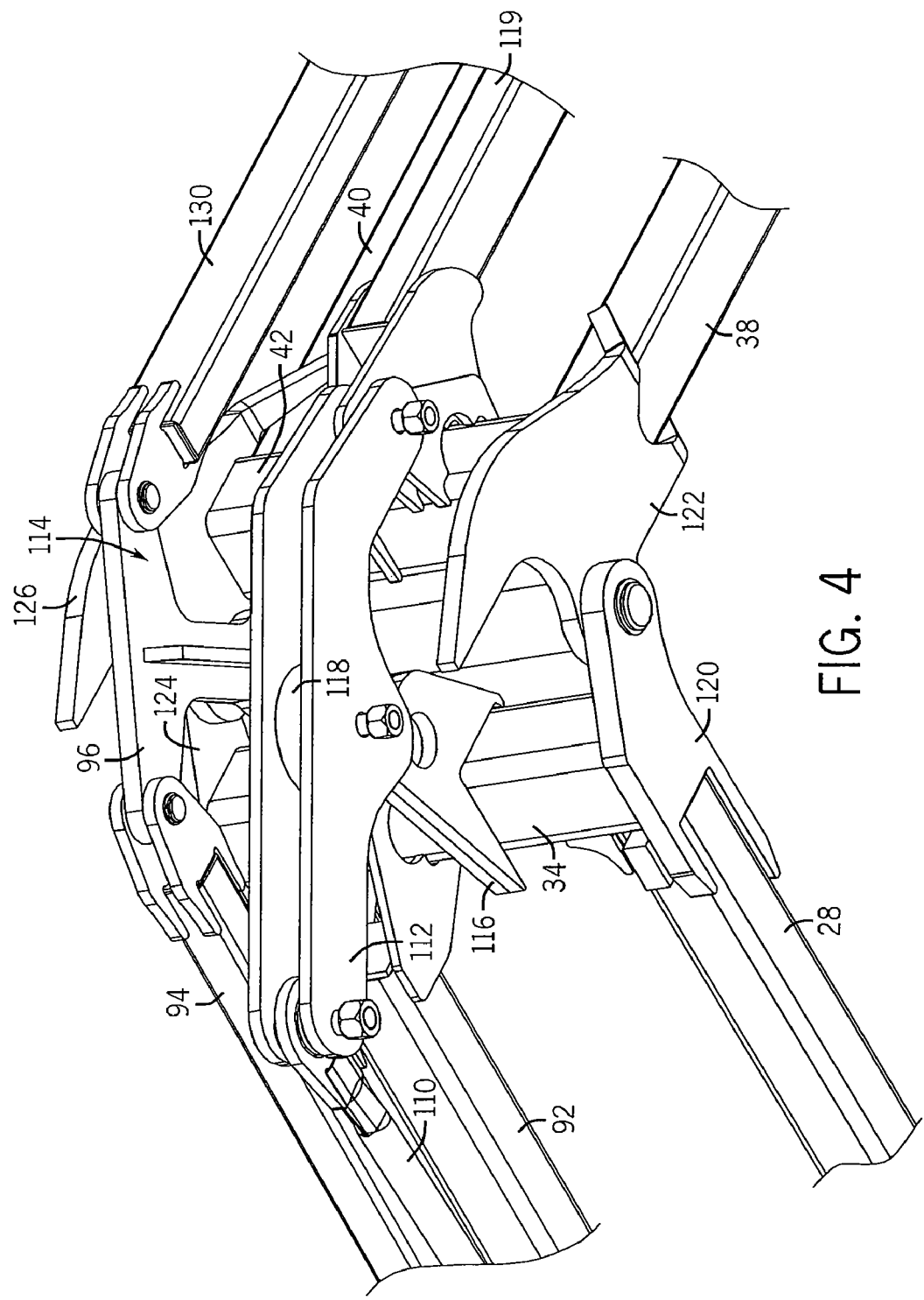
FIG. 4 is a top isometric view of the interconnection of the inner frame section and central frame section of the marker assembly of FIG. 1.

The inner frame section 16 also includes a parallel link 94 that is connected at one end to the outer knuckle member 62 in a conventional manner and is connected at the opposite end to a bridge link 96, as shown in FIG. 4, which will be described more fully below. As will be also be described more fully below, when the actuator 90 is extended, the parallel link 92 is also extended which, in effect, causes a lowering of the inner frame section 16. Because of counterpart parallel links in the central frame section 18, extension of the actuator 90 also causes extension and lowering of the central frame section 18, which in turn causes a lowering of the outer frame section 22. Retraction of the cylinder 90 results in the linkages being retracted to an upright retracted position.

Referring again to FIGS. 2 and 3, the marker assembly 10 also includes a float link 98 that connects the outer knuckle member 62 and the cylinder 90. The float link 98 is bolted to a pair of arms 100, 102 formed with and extending upwardly from the outer knuckle member 62. The bolt 104 effectively forms a pivot which allows the float link 98 to rotate to accommodate the motion of the marker assembly 10 in response to ground contours. A bottom surface 105 of the float link 98 limits how far the float link 98 may pivot and optional bumpers 106, 108 mounted to cross tube 32 may be used to limit downward movement of the float link 98. In a preferred embodiment, the float link 98 allows 30 degrees of vertical movement in response to surface contours with preferably 15 degrees of lift and 15 degrees of lower relative to a neutral position.

The inner frame section 16 also has a rigid link 110 that is connected at one end to the outer knuckle member 62 in a conventional manner and is connected at the opposite end to a lever arm 112, as also shown in FIG. 4. The lever arm 112 forms part of a cam and roller assembly 114 that further includes a cam 116 and a cam roller 118. The cam 116 is interconnected to the cross tube 34 and the cam roller 118. The lever arm 112 is also connected to a center link 119 of the central frame section 18.

During deployment of the marker assembly 10, there is a point at which the wheel 24 will engage the surface and move outwards away from the implement. The point where the wheel 24 engages the surface is set by the rigid link 110 and the cam assembly 114. That is, the rigid link 110 pulls down on the lever arm 112 causing the central frame section 18 to move away from the inner frame section 16. The amount the central frame section 18 moves away is determined by the profile of the cam 116. The cam roller 118 follows the cam profile changing the distance the lever arm 112 is away from the inner section 16. This variation in distance provides control of the distance at which the wheel 24 engages the soil surface. Moreover, the cam assembly 114 provides gradual increases in the loading of the rigid link 110.

Figure 5:
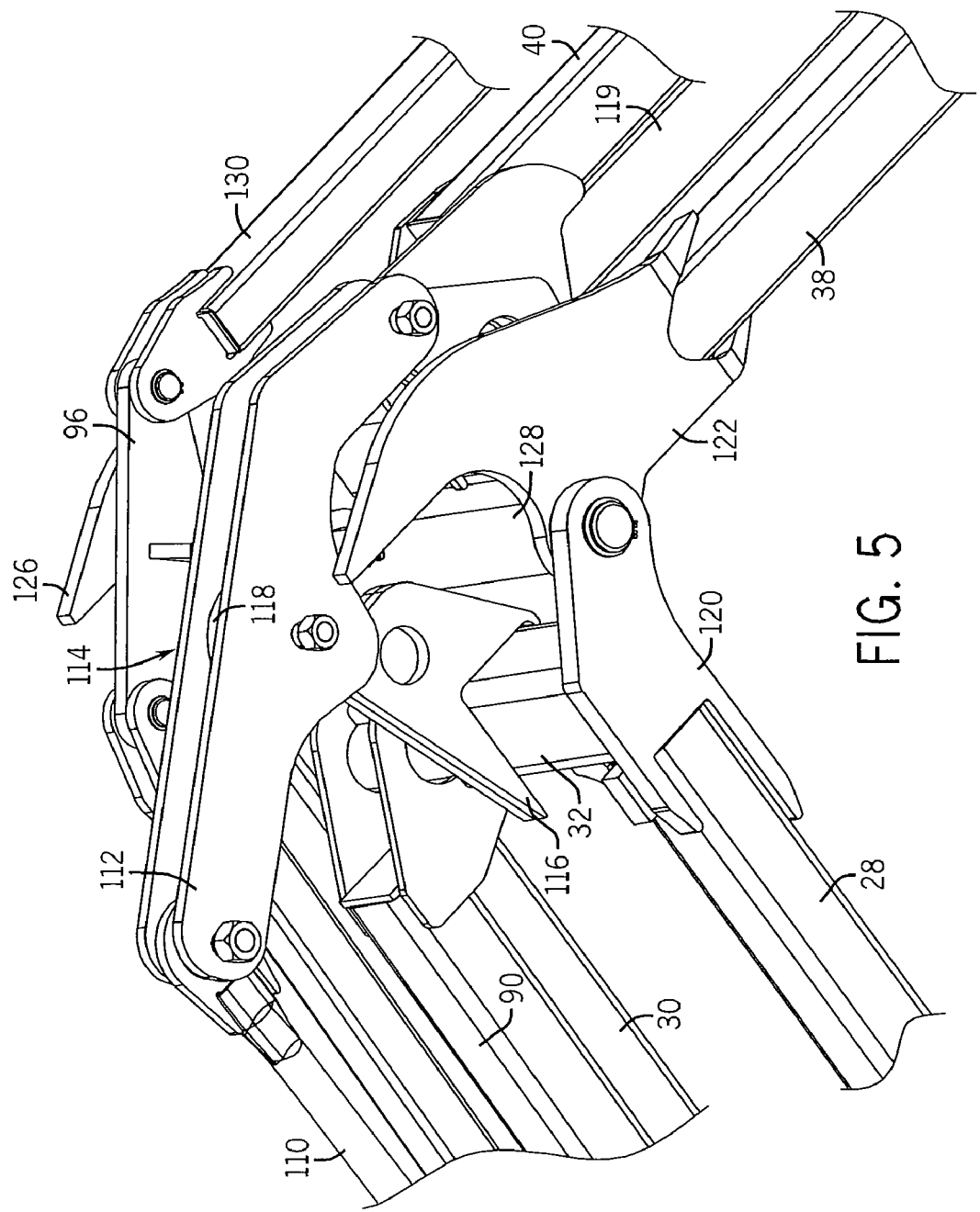
FIG. 5 is a side isometric view of that shown in FIG. 4.
Figure 6:
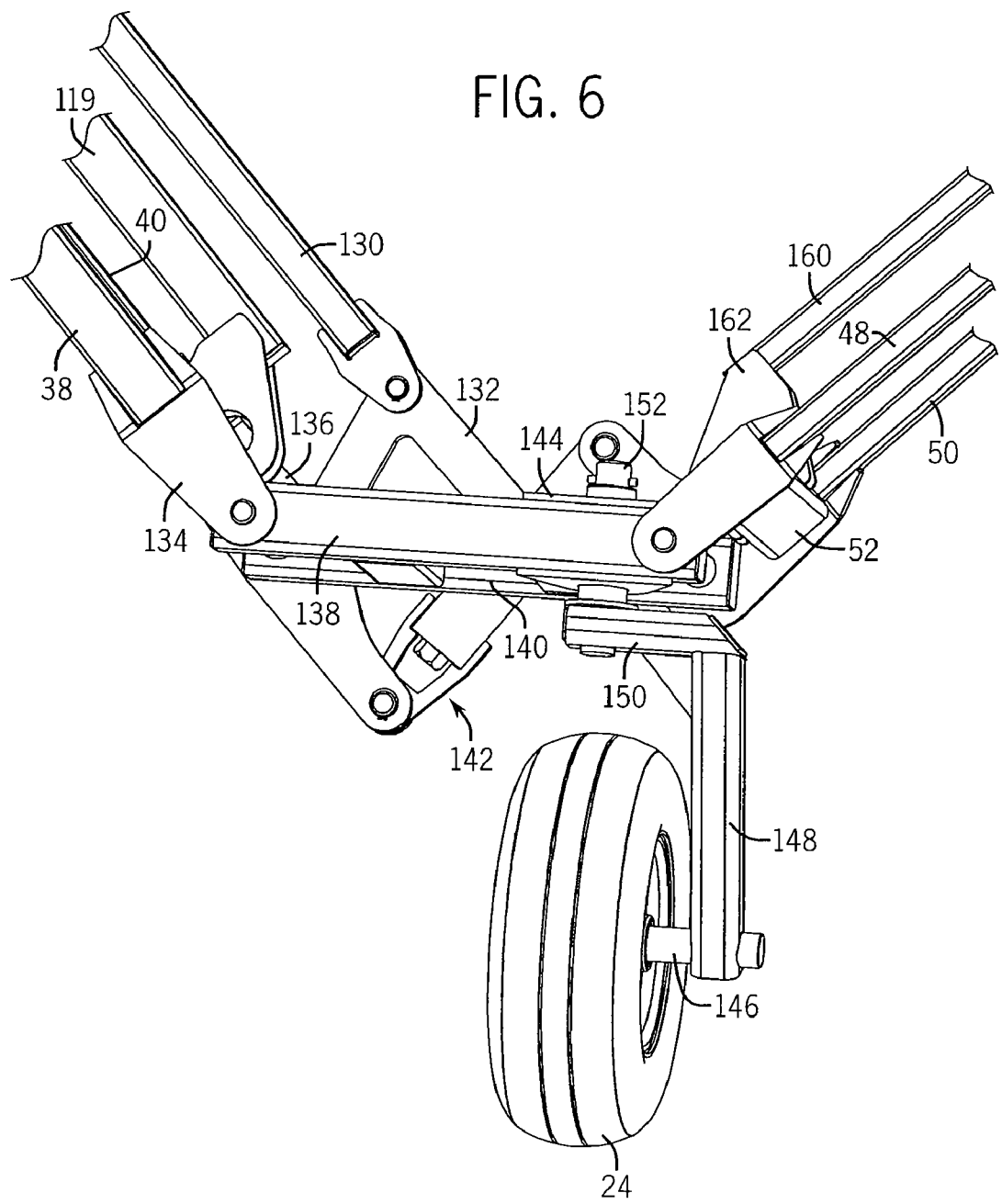
FIG. 6 is a side isometric view of the interconnection of the central frame section, a caster wheel assembly, and an outer frame section of the marker assembly of FIG. 1.
Figure 7:
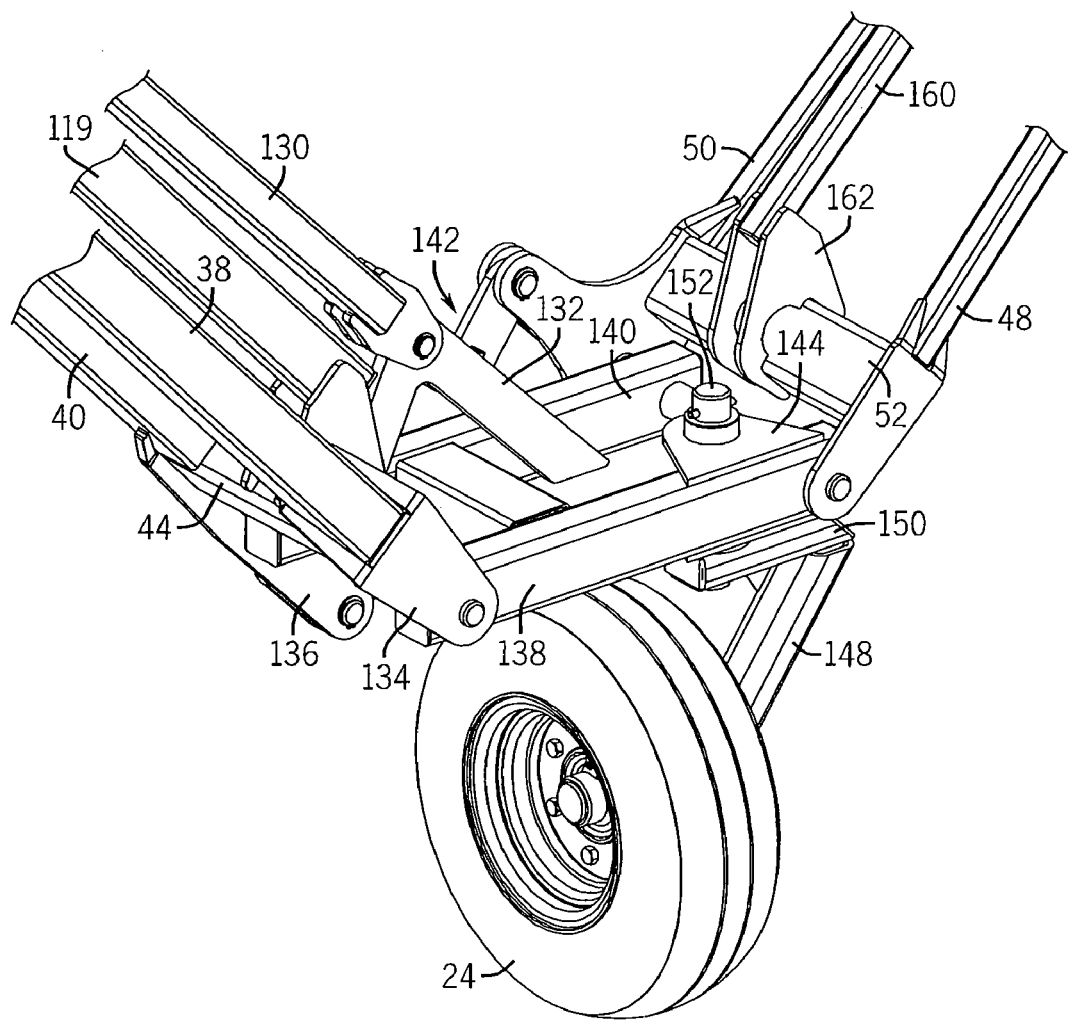
FIG. 7 is a top isometric view of that shown in FIG. 6.

Referring to FIGS. 4 through 6, the central frame section 18 includes tubes 38, 40 which are connected to one another by cross tube 42. Tubes 28 and 38 are interconnected to one another by end plates 120 and 122, respectively. Similarly, tubes 30 and 40 are interconnected to one another by end plates 124 and 126, respectively. The end plates are connected to a common pivot rod 128 in a manner that allows the inner frame section 16 and the central frame section 18 to pivot with respect to one another when the marker assembly 10 is being deployed or retracted.

The central frame section 18 also includes a parallel link 130 that is connected to parallel link 94 by bridge link 96. One skilled in the art will appreciate that link 130 reacts to movement of parallel link 94 during deployment and retraction of the marker assembly.

The parallel link 130 is also connected to a bridge link 132, as shown in FIG. 6. Similarly, tubes 38 and 40 have plates 134 and 136 that are connected to cross tube 44 and to respective tubes 138 and 140 of the wheel mount assembly 20. The bridge link 132 is connected to the outer frame section 22 by a spring linkage 142, which will be described more fully with respect to FIGS. 9 and 10.

Wheel 24 is mounted to a wheel mount 144 that is formed with, or otherwise connected to, tube 138. The wheel 24 has an axle 146 to which an offset arm 148 is connected. The offset arm 148 is in turn connected to a pivot arm 150 that is secured to the wheel mount 144 by a vertical pivot pin 152. The pivot arm 150 is mounted to the pivot pin 152 in a manner that allows the pivot arm 150 to caster freely about the vertical axis defined by the pivot pin 152. This movement of the pivot arm 150 in turn allows the wheel 24 to caster. This is particularly advantageous when the wheel 24 encounters an obstruction to avoid damage to wheel 24 or other components of the marker assembly 10.

Additionally, during deployment of the marker assembly 10, as noted above, the wheel 24 engages the soil surface before the marker assembly 10 is fully deployed. The marker assembly 10 is deployed in a lateral direction, i.e., in a direction perpendicular to the direction of travel of the implement. A conventional wheel is only permitted to rotate along a rotational axis that is perpendicular to the travel direction of the implement and thus during deployment, the wheel is pushed along the soil surface, which can cause damage to the wheel or other components of the marker assembly 10. The present invention, however, allows the wheel 24 to caster and thus, during deployment and when the wheel 24 engages the surface, the wheel 24 can rotate around an axis that is parallel to the direction of travel of the implement to effectively walk the marker assembly to the deployed position. This removes some of the loading on the mount 14 during deployment of the marker assembly 10. Similarly, during retraction of the marker assembly, the wheel 24 can caster to a position to rotate toward the agricultural implement to provide support for the outer and central frame sections until the marker assembly 10 is lifted off the ground by actuator 88.

Figure 8:
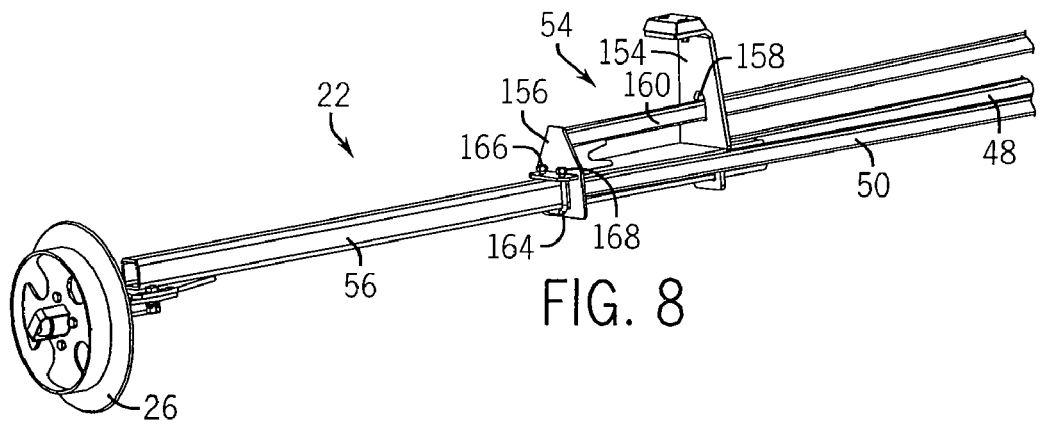
FIG. 8 is an view of the outer frame section of the marker assembly of FIG. 1.

Referring now to FIG. 8, the outer frame section 22 includes tubes 48, 50 and a telescoping link 56. Retainer 54 includes first and section flanges 154 and 156 to which tubes 48 and 50 are connected. Flange 154 has an opening 158 through which a center tube 160 extends. The center tube 160 is connected to cross tube 52, FIG. 6, by a connecting element 162, FIG. 7, and is connected to flange 156. Flange 156 has an opening (not numbered) through which link 56 may be inserted. The retainer 54 also has a U-bolt 164 that is aligned with the opening in the flange 156 so that the link 56 is passed through the opening (not numbered) defined by the U-bolt 164. Fasteners 166, 168 may be tightened to draw the U-bolt 164 into engagement with the link 56 and secure the link 56 to the flange 156. Marking wheel 26 is connected to a distal end of the link 56.

The construction of the link 56 and retainer 54 allows a user to manually set the point where the link 56 is locked in position. Changing the position where the link 56 is secured to the retainer 54 changes the distance the wheel 26 is from the tubes 48, 50 and thus from the agricultural implement.

Figure 10:
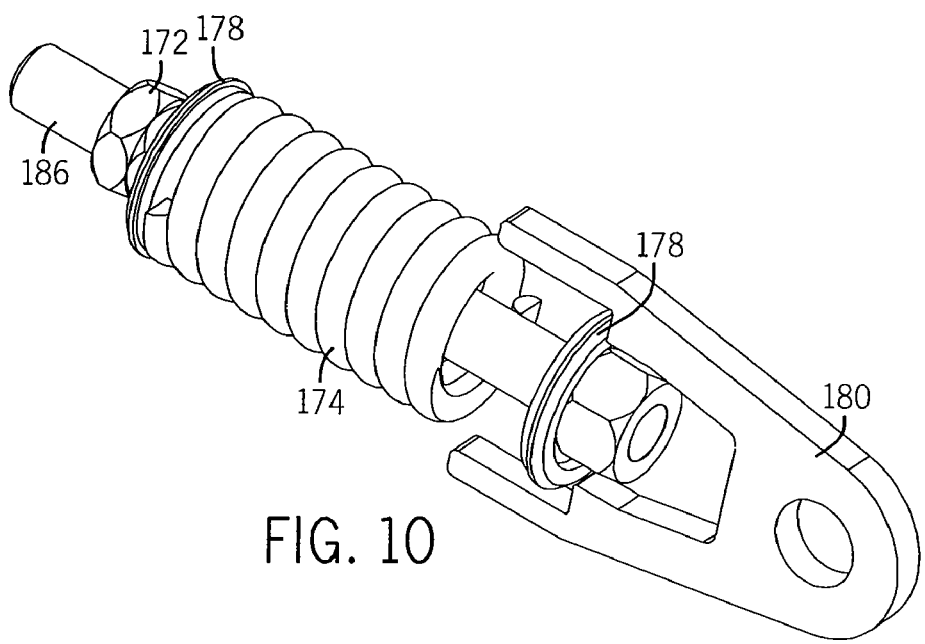
FIG. 10 is an isometric view of a spring link for use with the marker assembly of FIG. 1 according to one embodiment of the present invention.
Figure 9:
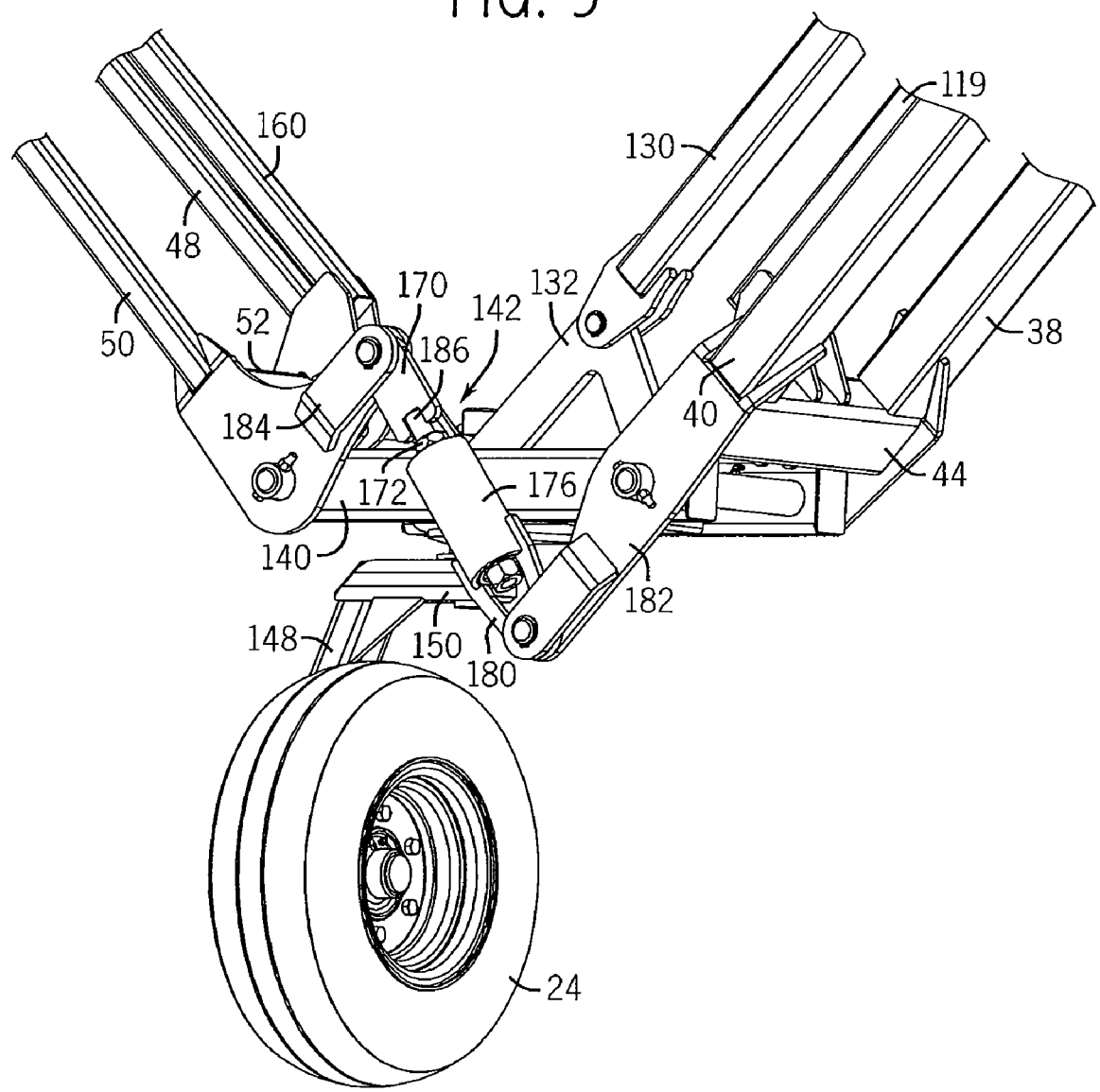
FIG. 9 is a rear isometric view of that shown in FIG. 6.

Referring now to FIGS. 9 and 10, as mentioned above, a spring link 142 interconnects the central frame section 18 and the outer frame section 22. The spring linkage 142 is generally comprised of a rod end 170, catch nuts 172, a compression spring 174 contained within a spring housing 176, compression washers 178, and a cylinder end 180. As shown in FIG. 9, the cylinder end 180 is connected to tube 40 by a connector 182 and the rod end 140 is connected to the outer section linkage 22 by a bracket 184.

The spring 174 is retained by washers 178 within housing 176. A linkage rod 186 passes through the housing 176 and has nuts 172 that are sized to catch the washers 178. If the linkage is compressed or extended, the catch nuts 172 press up against the washers 178, which results in compression of the spring 174. By compressing the spring, a force is applied in the opposite direction as the momentum in the marker assembly during deployment, thereby resulting in a reduction in the momentum in the marker assembly during deployment. It will therefore be appreciated that the spring link 142 allows for rapid deployment of the marker assembly without compromising the outer frame section's ability to follow ground contours.

Additionally, while the marker assembly has been shown and described as being configured to pivot rearwardly at mounting assembly 14, it is understood that the marker assembly could be configured to pivot at other points along its length, such as approximate the marking disc 26.

Many changes and modifications could be made to the invention without departing from the spirit thereof. The scope of these changes will become apparent from the appended claims.

We claim:

1. A marker assembly comprising:
   a first frame section and a second frame section pivotably connected to the first frame section by an outer knuckle;
   a rigid link connected to the outer knuckle; and
   a cam and roller assembly interconnected between the outer knuckle and the second frame section, and
   wherein the rigid link is operative to pivot the second frame section away from the first frame section as the first frame section is lowered to a working position.

2. The marker assembly of claim 1 further comprising a lever arm interconnecting the outer knuckle and the second frame section and wherein lowering of the first frame section to the working position causes the rigid arm to pull down on the lever arm which in turn causes pivoting away of the second frame section from the first frame section.

3. The marker assembly of claim 1 further comprising a wheel mounted to the second frame section, wherein the wheel is adapted to engage a working surface as the first frame section is lowered to the working position, and wherein a ground engaging position of the wheel is controlled by the rigid link and the cam and roller assembly.

4. The marker assembly of claim 3 wherein the distance the second frame section pulls away from the first frame section is determined by a profile of the cam.

5. The marker assembly of claim 4 wherein the roller assembly includes a roller and wherein the roller follows the profile of the cam to control the pivoting of the second frame section away from the first frame section.

6. The marker assembly of claim 1 wherein the rigid link has a first end connected to the inner knuckle and a second end connected to the second frame section via a lever arm.

7. The marker assembly of claim 6 wherein the inner frame section includes an actuator that when actuated causes the rigid link to pull down on the lever arm.

8. The marker assembly of claim 7 wherein the actuator is a hydraulic cylinder having a chamber and a ram.

9. The marker assembly of claim 7 wherein the first frame section has a first parallel link and the second frame section has a second parallel link connected to the first parallel link by a bridge link, and wherein the actuator is connected to the first frame section and the first parallel link moves relative to the first frame section causing the second parallel link to move in response to movement of the first parallel link.

10. A marker assembly comprising:
    a frame assembly having an inner frame section and an outer frame section;
    a mounting member connected to the inner frame section and adapted to couple the frame assembly to a frame of an agricultural implement;
    a coupler interconnecting the inner frame section and the outer frame section;
    a first parallel linkage generally parallel with the inner frame section and connected to the mounting member and the coupler;
    a second parallel linkage generally parallel with the outer frame section and connected to the coupler;
    a rigid linkage connected to the mounting member and the coupler;
    an actuator operative to raise and lower the inner frame section relative to the mounting member; and
    wherein the rigid linkage operates on the coupler to transfer forces placed thereon to the second parallel linkage to move the outer frame section away from the inner frame section when the inner frame section is being lowered and toward the inner frame section when the inner frame section is being raised.

11. The marker assembly of claim 10 further comprising a cam and a roller assembly interconnected between the coupler and the outer frame section.

12. The marker assembly of claim 11 further comprising a wheel mounted to the outer frame section, wherein the wheel is adapted to engage a working surface as the outer frame section is lowered to a working position, and wherein a ground engaging position of the wheel is controlled by the rigid link and the cam and roller assembly.

13. The marker assembly of claim 12 wherein the distance the outer frame section pulls away from the inner frame section is determined by a profile of the cam.

14. The marker assembly of claim 12 wherein the roller assembly includes a roller and wherein the roller follows the profile of the cam to control the pivoting of the outer frame section away from the inner frame section.

15. The marker assembly of claim 10 wherein the actuator is a hydraulic cylinder having an extendible and retractable ram.

16. The marker assembly of claim 10 further comprising a bridge link interconnecting the rigid link and the coupler.

17. The marker assembly of claim 10 further comprising a marker wheel connected to the outer frame section.

18. A marker assembly for use with an agricultural implement, comprising:
    a frame having an inner frame section, a center frame section, and an outer frame section, wherein adjacent frame sections are configured to pivot relative to one another;
    a marking disc mounted to the outer frame section, wherein the outer frame section has a telescoping member that allows adjustment of a position of the marking disc away from the center frame section;
    a cam and roller assembly interconnecting the inner and center frame sections;
    a rigid linkage connected to the cam and roller assembly such that movement of the rigid linkage downward causes upward rotation of the center frame section relative to the inner frame section.

* * * * *